(12) United States Patent
Haupt

(10) Patent No.: US 9,987,918 B2
(45) Date of Patent: Jun. 5, 2018

(54) ELECTRIC DRIVE AND DRIVELINE ASSEMBLY

(71) Applicant: GKN Automotive Ltd., Redditch, Worcestershire (GB)

(72) Inventor: Jan Haupt, Kürten (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 0 days. days.

(21) Appl. No.: 15/531,473

(22) PCT Filed: Nov. 16, 2015

(86) PCT No.: PCT/EP2015/076684
§ 371 (c)(1),
(2) Date: May 30, 2017

(87) PCT Pub. No.: WO2016/087178
PCT Pub. Date: Jun. 9, 2016

(65) Prior Publication Data
US 2017/0326963 A1 Nov. 16, 2017

(30) Foreign Application Priority Data

Dec. 1, 2014 (DE) .................. 10 2014 117 570

(51) Int. Cl.
*B60K 6/48* (2007.10)
*B60K 1/00* (2006.01)
(Continued)

(52) U.S. Cl.
CPC ................. *B60K 6/48* (2013.01); *B60K 1/00* (2013.01); *B60K 6/365* (2013.01); *B60K 6/40* (2013.01);
(Continued)

(58) Field of Classification Search
USPC ........................................................ 475/150
See application file for complete search history.

(56) References Cited

U.S. PATENT DOCUMENTS 5,751,081 A  5/1998 Morikawa
6,401,850 B1  6/2002 Bowen
(Continued)

FOREIGN PATENT DOCUMENTS

DE        10146386 A1    4/2003
DE  10 2011 018 861 A1  10/2012
(Continued)

OTHER PUBLICATIONS

International Search Report and Written Opinion for PCT/EP2015/076684 dated Feb. 9, 2016 (with English translation; 20 pages).

*Primary Examiner* — Dirk Wright
(74) *Attorney, Agent, or Firm* — Bejin Bieneman PLC

(57) ABSTRACT

An electric drive for driving a motor vehicle comprises an electric machine, a transmission gearing and a differential drive; wherein the electric machine comprises a motor shaft that is rotatably driveable around a first rotational axis A1; wherein the transmission gearing comprises a drive gear connected to the motor shaft, at least one intermediate gear rotatingly drivable by the drive gear around a second rotational axis A2, a crown gear rotatingly drivable by the intermediate gear around a third rotational axis A3, and a driven gear connected to the crown gear; wherein the driven gear and the crown gear are arranged coaxially relative to one another and are connected to one another in a rotationally fixed way so that they rotate jointly around the third rotational axis A3, wherein the third rotational axis A3 crosses the first rotationally axis A1. A driveline assembly can have such an electric drive.

13 Claims, 2 Drawing Sheets

Figure 1:
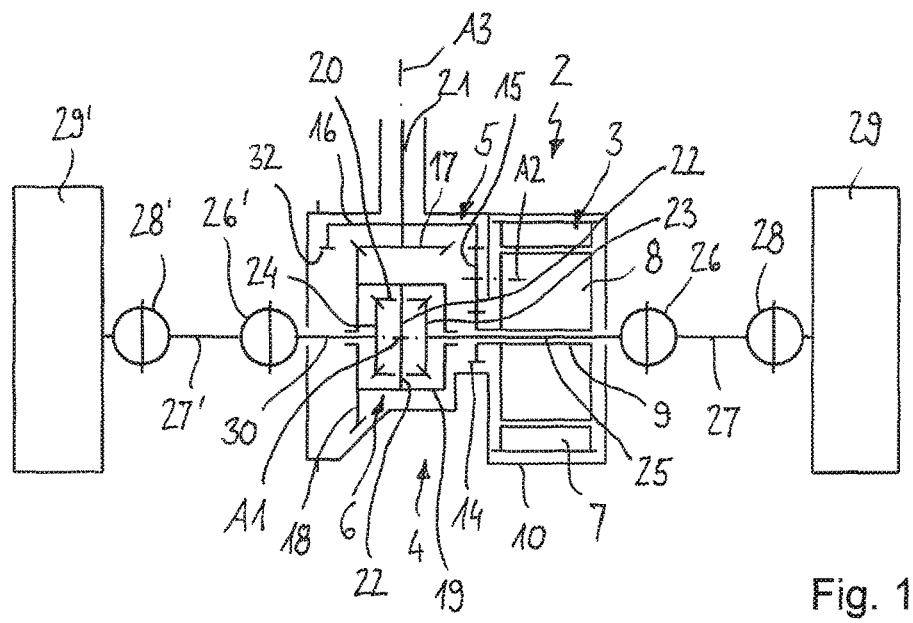

(51) Int. Cl.
  *F16H 48/08* (2006.01)
  *F16H 1/20* (2006.01)
  *F16H 37/08* (2006.01)
  *F16H 57/037* (2012.01)
  *B60K 6/40* (2007.10)
  *B60K 6/365* (2007.10)
  *F16H 57/02* (2012.01)
  *B60K 6/52* (2007.10)

(52) U.S. Cl.
  CPC ......... *F16H 1/203* (2013.01); *F16H 37/0813* (2013.01); *F16H 48/08* (2013.01); *F16H 57/037* (2013.01); *B60K 6/52* (2013.01); *B60K 2001/001* (2013.01); *B60Y 2200/92* (2013.01); *F16H 2057/02034* (2013.01); *Y10S 903/91* (2013.01); *Y10S 903/916* (2013.01)

(56) References Cited

U.S. PATENT DOCUMENTS

| | | | |
|---|---|---|---|
| 7,311,631 B2* | 12/2007 | Kushino | B60K 6/365 475/221 |
| 7,651,426 B2* | 1/2010 | Yokoyama | B60K 6/365 475/19 |
| 9,636,988 B2* | 5/2017 | Pinschmidt | B60K 6/365 |
| 9,694,662 B2* | 7/2017 | Nett | B60K 1/00 |
| 2007/0023211 A1 | 2/2007 | Keller et al. | |
| 2008/0223635 A1 | 9/2008 | Noiret | |
| 2016/0138695 A1* | 5/2016 | Tronnberg | F16H 48/36 475/150 |

FOREIGN PATENT DOCUMENTS

EP         1377473 B1     7/2008
WO      2014033137 A1     3/2014

* cited by examiner

ELECTRIC DRIVE AND DRIVELINE ASSEMBLY

This application is a national stage of, and claims priority to, Patent Cooperation Treaty Application No. PCT/EP2015/076684, filed on Nov. 16, 2015, which application claims priority to German Application No. DE 10 2014 117 570.0, filed on Dec. 1, 2014, which applications are hereby incorporated herein by reference in their entireties.

The present disclosure relates to an electric drive for driving a driving axle of a motor vehicle. The electric drive can serve as the only driving source for the motor vehicle or it can be provided in addition to an internal combustion engine, wherein the electric drive and the internal combustion engine are able to drive the motor vehicle each one on its own or they can be superimposed on one another. Such drive concepts with two driving sources can also be referred to as "hybrid drives." Normally, an electric drive comprises an electric motor succeeded by a transmission gearing which translates an introduced high rotational movement into a slow rotational movement. The transmission gearing is drivingly connected to a subsequent differential drive which divides the introduced torque to two sideshafts for driving the vehicle wheels of a motor vehicle.

From US 2007/002311 A1 an electric drive is known in the form of an auxiliary drive for driving the front axle of a motor vehicle which comprises an internal combustion engine as the main drive for driving the rear axle. The electric drive comprises an electric motor, a planetary gearing and a differential gearing which are arranged coaxially relative to one another.

EP 1 377 473 B1 a similarly configured driving axle is known having an electric motor, a planetary gearing and a differential gearing for a hybrid vehicle.

From US 2008/0223635 A1 a hybrid driveline is known having an internal combustion engine, a transmission gearing, a differential gearing, a first electric motor and a second electric motor. The differential gearing comprises two inputs and can be driven both by the internal combustion engine and by the first electric motor. The first electric motor is coaxially arranged relative to the differential gearing.

From DE 101 46 386 A1 a drive unit for a multi-axle driven motor is known. The drive unit comprises an internal combustion engine as the primary driving source for solely driving the first driving axle, and an electric motor as secondary driving source that, together with the primary driving source, serves for driving the second driving axle. The electric motor and a superimposition gearing arranged downstream in the power path are arranged coaxially relative to the longitudinal driveshaft of the motor vehicle.

Electric motors with a power of 48 volts are normally configured—at high speeds of up to 12,000 r.p.m. (revolutions per minute)—to provide relatively low torque values of about 50 Nm (Newton-meters). This makes it necessary to use transmission gearings that translate the high speed of the electric motor into a low speed.

The present disclosure includes a drive assembly having an electric machine and a differential drive arranged coaxially relative thereto which require little space and are therefore suitable for being incorporated into a rear axle of a motor vehicle.

A solution is provided by an electric drive comprising: an electric machine, a transmission gearing and a differential drive; wherein the electric machine comprises a motor shaft configured as a hollow shaft that is rotationally driveable around a first rotational axis (A); wherein the transmission gearing comprises a drive gear connected to the motor shaft, at least one intermediate gear rotatingly drivable by the drive gear around a second rotational axis, a crown gear drivable by the at least one intermediate gear around a third rotational axis, and a driven gear connected to the crown gear, wherein the driven gear and the crown gear are arranged coaxially relative to one another and are connected to one another in a rotationally fixed way so that they rotate jointly around the third rotational axis, wherein the third rotational axis crosses the first rotational axis.

An advantage is that the electric drive has a particularly compact design due to the differential drive and the electric machine being arranged coaxially relative to one another as well as the transmission gearing being provided with a crown gear. The transmission gearing is configured to translate a high speed into a low speed. Thus, the differential drive rotates much slower than the motor shaft of the electric motor. In this case the crown gear allows that the transmission ratio required for driving the differential drive by the electric machine to be reduced, or can form part of the transmission ratio. The driven gear of the transmission gearing transmits the torque to the differential drive; it can also be referred to as drive gear or drive pinion. The differential drive divides the torque introduced to two output gears which can also be referred to as sideshaft gears. The sideshaft gears each serve to drive an associated sideshaft and a motor vehicle wheel connected thereto.

The electric machine converts energy and can operate as a motor or generator. In motor operation, the electric machine converts electric energy into mechanical energy, so that the driving axle of the motor vehicle can be driven. In generator operation, the electric machine converts mechanical energy into electric energy which can then be stored in a battery. This process, by which braking energy of the motor vehicle is recovered, is also referred to as recuperation.

Individual components of the transmission gearing and of the differential drive respectively are each drivingly connected to other components for transmitting torque. The formulations "rotatingly drivable" or "drivingly connected" shall each comprise the possibility that between a driving component and the component rotatingly driven thereby, one or more further components can be interposed in the power path. For example, between the drive gear and the intermediate gear and/or between the intermediate gear and the crown gear, one or more further gears can be incorporated. It is also possible that in the power path between two drivingly connected components a clutch is arranged that can optionally effect or interrupt a transmission of torque.

The crown gear has face teeth that point towards the differential drive and that are positioned on a greater diameter than the teeth of the driven gear. The single teeth of the crown gear can comprise, in their longitudinal extension, a variable cross-section and a height that varies relative to the tooth base lines. With reference to the crown gear axis, the teeth can widen radially outwardly in order to achieve a uniform engagement with the teeth of the intermediate gear. The central lines of the tooth flanks of the crown gear teeth can be arranged in a plane which is normal relative to the rotational axis of the crown gear, so that any contact lines of the engagement between the teeth of the crown gear and of the immediate gear meshing therewith extend parallel to the axis of the intermediate gear.

The crown gear teeth and the intermediate gear teeth can be configured as straight teeth or helical teeth. The crown gear can be produced, for example, by a forming process, more particularly by forging or primary shaping, in particular by sintering. The intermediate gear engages the crown gear and comprises corresponding teeth. The intermediate gear is preferably configured as a cylindrical gear with face teeth, with the teeth of the intermediate gear corresponding to the teeth of the crown gear as straight teeth or helical teeth.

The rotational axis of the crown gear and the input gear connected thereto (third rotational axis) crosses the rotational axis of the differential and the electric motor (first rotational axis). This shall include, in particular, that the third rotational axis intersects the first rotational axis if viewed in an orthogonal projection of the two rotational axes. The two rotational axes can cross each other at a distance or they can actually intersect in a point of intersection. An angle enclosed between the two rotational axes—if viewed in the orthogonal projection—amounts to in particular 90°, with any deviations of e.g. up to ±10° not being excluded.

The electric drive can be configured in such a way that the third rotational axis crosses at least one of the first rotational axis and of the second rotational axis at a distance. Alternatively or additionally, the electric drive can also be configured such that the third rotational axis intersects at least one of the first rotational axis and of the second rotational axis. "At least one of the first and of the second axis" is intended to mean that the first and/or the second rotational axis can be arranged accordingly. This results in different configurations, i.e., that the third rotational axis crosses the first and the second rotational axis at a distance, or crosses the first rotational axis at a distance and intersects the second rotational axis, or intersects the first rotational axis and crosses the second rotational axis at a distance. The suitable configuration can be selected according to the space conditions of the concrete vehicle and the respective technical requirements.

The at least one intermediate gear is arranged and/or configured such that the distance between the motor drive gear and the crown gear is bridged. In this case, the second rotational axis of the intermediate gear can be arranged parallel relative to the first rotational axis, i.e. between the first rotational axis and a radial plane span by the crown gear teeth. According to an example, exactly one intermediate gear can be provided that engages the driving gear drivable by the electric machine and the crown gear. As mentioned above, it is also possible to arrange further components in the power path, for example one or several further intermediate gears.

The transmission gearing and the differential drive which, jointly, can also be referred to as a transmission unit, are configured such that between the electric machine and the output parts of the differential drive, and the sideshafts of the motor vehicle drivingly connected thereto, a transmission ratio is provided which can be between 8 and 12 in total. For this purpose, it can be proposed that the crown gear comprises a greater diameter and a larger number of teeth than the drive gear, wherein a first transmission ratio (i1) between the drive gear and the crown gear can be, for example, between 3 and 4. Furthermore, the driven gear connected to the crown gear can comprise a smaller diameter and a smaller number of teeth than the crown gear, wherein the second transmission ratio (i2) between the crown gear and the driven gear can be, for example, between 2 and 3. The product of the first and of the second transmission ratio then forms the total transmission ratio (iges).

The driven gear and the crown gear are connected to one another in a rotationally fixed way so that they rotate jointly. Said connection can be achieved by all technically conceivable possibilities, for example by a form-locking connection such as splines, a force-locking connection such as a screwed connection, a material-locking connection such as welding or a combination of said possibilities. The driven gear and the crown gear can be first produced as separate components and subsequently connected to each other, wherein an integral production is generally also possible. The driven gear and the crown gear can also be connected to each other indirectly, for instance via a drive part that can be connected to both gears, for example, via respective splines. The drive part can be a shaft journal, for example, which can be driven by a drive shaft of the motor vehicle, in particular a propeller shaft. The unit comprising the driven gear and the crown gear can thus be driven in two ways, i.e., via the electric motor that can introduce torque into the crown gear, or via a further driving source that can introduce torque into the drive part connected to the crown gear. In this case, the introduction of torque from the electric motor and from the further driving source can be effected individually or in a superimposed way.

The differential drive can comprise a differential carrier which is rotatingly driveable by the driven gear around the first rotational axis, as well as a plurality of differential gears that rotate jointly with the differential carrier around the first rotational axis, and that are drivingly connected to the two output gears. According to an example, the differential drive can be provided in the form of a bevel gear differential, i.e., the differential gears and the sideshaft gears are provided in the form of bevel gears. However, other embodiments are also possible, such as a planetary gear differential. The differential drive can comprise a ring gear that is arranged coaxially relative to the differential carrier and is fixedly connected thereto, wherein the ring gear and the electric machine are arranged on different sides with respect to a central plane of the differential drive. In this way, an advantage in respect of spatial conditions of the unit is achieved.

The driven gear of the transmission gearing engages the ring gear of the differential drive, wherein the two gear axes intersect one another or cross each other at a distance and, in particular, are arranged perpendicularly relative to each other. The gear set including the driven gear and the ring gear can also be referred to as a hypoid set or angle drive. The two output gears of the differential drive are each connected in a rotationally fixed way to an output shaft for driving a vehicle wheel. It is proposed in particular that one of the two output shafts of the differential drive is arranged coaxially relative to the hollow shaft of the electric machine and extends through same.

According to an example, the electric machine, the transmission gearing and the differential drive comprise a common housing. This includes the possibility that individual components are accommodated in separate housing parts, wherein the individual housing parts can be connected to one another, for instance by flange connections.

Furthermore, a solution includes a driveline assembly for a multi-axle driven motor vehicle, comprising: a first driveline having a first driving axle which is driveable by a first driving source; and a second driveline having a second driving axle which is driveable by the first driving source and optionally by an electric drive which is configured according to at least one of the above-mentioned embodiments. Said driveline assembly provides the above-mentioned advantages of having a compact design and requiring little space in the motor vehicle.

The second driveline can comprise a propeller shaft, wherein the driven gear of the differential drive and the crown gear of the transmission gearing can be connected to the propeller shaft in a rotationally fixed way. In this way, torque can be introduced from the first driving source as well as from the electric motor as second driving source into the differential drive for driving the associated driving axle. The electric drive that can also be referred to as a drive assembly can be used in a rear axle of the motor vehicle. In this case, the front axle would be the primary driving axle driven by the first driving source. Alternatively, the electric drive can also be used in a front axle, in which case the rear axle would then be the primarily driven driving axle.

Figure 2:
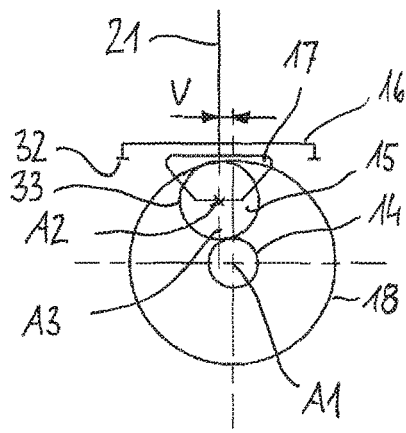
Figure 3:
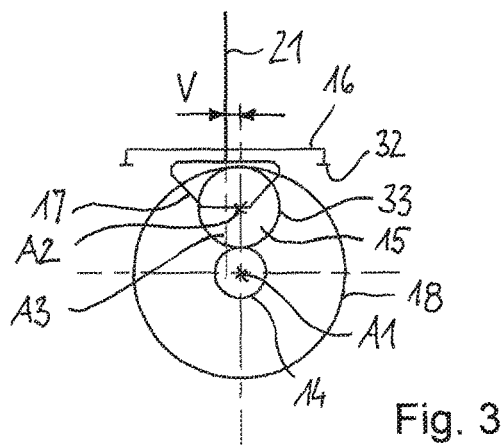

Example embodiments will be explained below with reference to the drawings wherein FIG. 1 is a diagrammatic illustration of an electric drive in a plan view;

FIG. 2 shows the electric drive according to FIG. 1 in an axial view;

FIG. 3 shown an a further example electric drive in an axial view.

Figure 4:
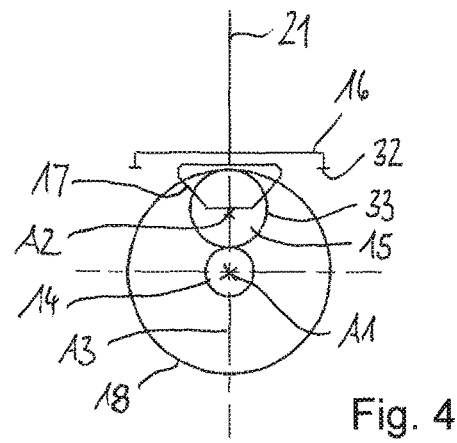
Figure 5:
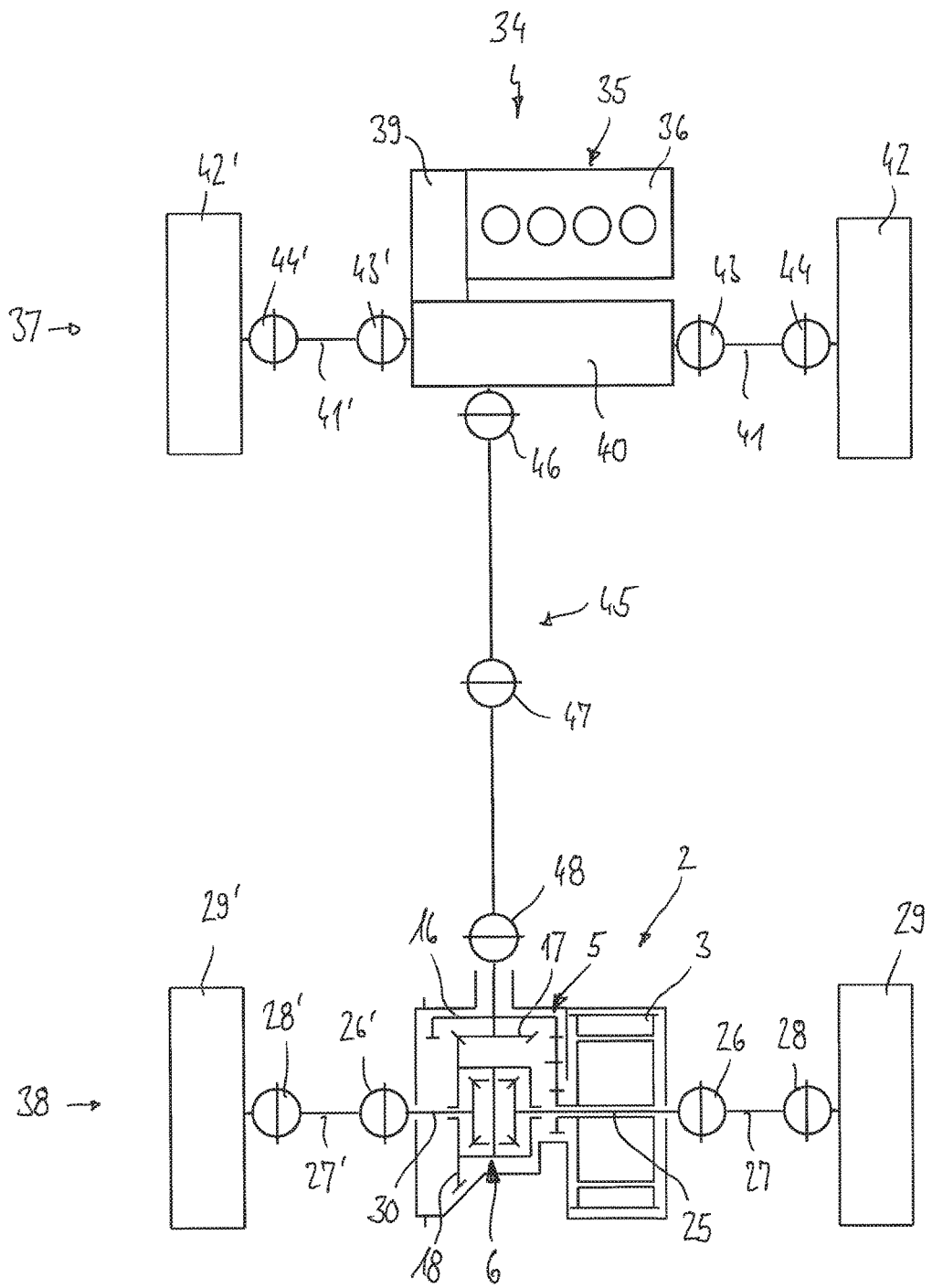

FIG. 4 shows a yet further example electric drive in an axial view in a further modified embodiment, and FIG. 5 schematically shows in a plan view an example driveline assembly having an example electric drive.

FIGS. 1 and 2 will be described jointly below. FIG. 1 shows an example electric drive 2 having an electric machine 3 and a transmission unit 4 rotatably drivable by the electric motor. The transmission unit 4 comprises a transmission gearing 5 and a differential drive 6 arranged downstream in the power path. The electric drive 2 can serve as a primary driving source, or as a secondary driving source for driving an optionally drivable secondary driving axle of a motor vehicle that comprises a primary driving source for driving a primary driving axle.

The electric motor 3 comprises a stator 7 and a rotor 8 rotatable thereto that, when the electric motor is supplied with current, rotatingly drives a motor shaft 9. The rotational movement of the motor shaft 9 is transmitted, via the transmission gearing 5 following in the performance path, to the differential drive 6. The electric motor 3 is supplied with electric current by a battery (not illustrated), wherein the battery can be charged with electric current when the electric machine operates as generator. Furthermore, the electric drive 2 comprises a housing 10 in which the electric motor 3 and the transmission unit 4 are arranged.

The transmission gearing 5 is configured such that a rotational movement introduced by the motor shaft 9 is translated from a high speed into a slow speed, which is the reason that the gearing can also be referred to as step-down gearing. The motor shaft 9 is provided in the form of a hollow shaft and is supported in the housing 10 so as to be rotatable around a first rotational axis A1 by means of bearings (not illustrated). A drive gear 14 (first gear) is connected to the driveshaft 9 in a rotationally fixed way, for example by splines, wherein it is understood that other connecting possibilities, like welding, can also be used.

The transmission gearing 5 comprises the drive gear 14, an intermediate gear 15 (second gear) rotatably drivable by the drive gear around a second rotational axis A2, as well as a crown gear 16 (third gear) that is rotatingly drivable by the intermediate gear 15 around a third rotational axis (A3) and a driven gear 17 (fourth gear) that is fixedly connected to the crown gear. The driven gear 17 engages the ring gear 18 of the differential drive 6 for driving same and can thus also be referred to as drive gear or drive pinion. The gear set including the drive pinion 17 and the ring gear 18 can be provided in the form of a hypoid set. In the power path between the electric machine 3 and the output parts of the differential drive 6 a controllable clutch (not illustrated) can be provided which, optionally, can effect or interrupt a transmission of torque between the electric machine 3 and the output parts of the differential drive.

The differential drive 6 comprises a differential carrier 19 fixed to the annular gear 18, a plurality of differential gears 20 connected to the differential carrier 19 that are rotatably supported on one or several journals connected to the differential carrier 19, as well as a first and a second side shaft gear 23, 24 forming the output parts which are rotatably driveable by the differential gears 20 around the rotational axis A1. In the present example, the differential drive is configured in the form of a bevel gear differential, wherein the differential gear set 19, 23, 24 is arranged in the differential carrier 19 which thus can also be referred to at a differential cage. The first sideshaft gear 23 is connected to a first output shaft 25 in a rotationally fixed way that is arranged coaxially relative to the rotational axis A1 and that passes through the motor shaft 9 configured as a hollow shaft. The output shaft 25 comprises an end portion arranged at the transmission side that is connected to the sideshaft gear 23 in a rotationally fixed way, as well as an end portion arranged away from the transmission, that is supported in the housing 10 so as to be rotatable around the rotational axis A1 and that is connected to a constant velocity joint 26. The constant velocity joint 26 serves to transmit torque from the first output shaft 25 to the first sideshaft 27 of the motor vehicle while carrying out angular movements. Via a further constant velocity joint 28 at the wheel end, the first sideshaft 27 is connected to a first vehicle wheel 29 for transmitting torque while carrying out angular movement. The first sideshaft 27 is connected to a first vehicle wheel via a wheel-sided further constant velocity joint 28 for transmitting torque under angular movement. The second sideshaft gear 24 drives the opposed second vehicle wheel 29' via a second output shaft 30, a constant velocity joint 26', a second sideshaft 27' and a constant velocity joint 28' at the wheel end.

The transmission gearing 5 is configured such that, between the electric machine 3 and the differential carrier 19, a translation from a high speed to a low speed is effected. The transmission ratio between the motor drive gear 14 and the differential carrier 19 can amount to between 8 and 12, for example. For this, the crown gear 16 can comprise a greater diameter and a greater number of teeth than the drive gear 14 and the driven gear 17 of the differential drive 6 can comprise a smaller diameter and a smaller number of teeth than the crown gear 16 arranged coaxially thereto. To achieve a total transmission ratio iges of 8 to 12, a first transmission ratio i1 formed between the drive gear 14 and the crown gear 16 can be between 3 and 4 for example, and a second transmission ratio i2 formed between the crown gear 16 and the driven gear 17 can be between 2 and 3, for example.

The driven gear 17 and the crown gear 16 of the transmission gearing are rotationally fixed to each other so that they jointly rotate around the rotational axis A3. The connection can be effected by form-locking, force-locking, and/or material locking. The unit consisting of the driven gear 17 and the crown gear 16 comprises a shaft journal 21 that can be supported in a sleeve portion of the housing 10 so as to be rotatable around the rotational axis A3. The shaft journal 21 can be drivingly connected to a driveshaft of a driveline (not illustrated) of the motor vehicle, so that torque can be introduced into the unit via both said driveshaft as well as by the electric machine 3, individually or in a superimposed manner.

The crown gear 16 comprises face teeth 32 that face towards the differential drive 6 and are arranged on a greater diameter than the teeth of the driven gear 17. The crown gear 16 engages the intermediate gear 15 which comprises teeth 33 corresponding to the crown gear teeth 32. The individual teeth of the crown gear teeth 32 can comprise, in a longitudinal extension, a variable cross-section and a height that varies with respect to the tooth base line. The teeth can widen radially outwardly with respect to the crown gear axis A3 to achieve a uniform engagement with the teeth of the intermediate gear 15. The central lines of the tooth flanks of the crown gear teeth are positioned in a plane that is normal relative to the rotational axis A3 of the crown gear, so that the contact lines of the tooth engagement between the crown gear 16 and the intermediate gear 15 meshing therewith extend parallel relative to the axis A2 of the intermediate gear. The intermediate gear 15 is provided in the form of a cylindrical gear with cylindrical teeth. The crown teeth 32 and the intermediate gear teeth 33 can be configured as straight teeth or helical teeth.

With reference to the first rotational axis A1 radially inside, the intermediate gear 15 engages the motor drive gear 14. The intermediate gear 15 is dimensioned such that the radial distance between the motor gear 14 and the crown gear 16 is bridged. In the present example, exactly one intermediate gear 15 is provided in the power path between the drive gear 14 and the crown gear 16. It is understood, however, that, depending on space conditions or other technical requirements, it is also possible to provide several intermediate gears for transmitting torque from the drive gear to the crown gear. It can be seen in particular in FIG. 2 that the rotational axis A2 of the intermediate gear 15 extends parallel to the rotational axis A1 of the drive gear 14 and intersects the rotational axis A3 of the crown gear 16. In this case, an axial offset V is formed between the rotational axis A3 and the rotational axis A1. Said offset V refers to both the pair of gears formed by the driven gear 17 and the annular gear 18, which can also be referred to as hypoid gear set, and to the pair formed by the intermediate gear 15 and the crown gear 16 which can also be referred to as the crown gear set.

FIG. 3 shows an example assembly that is slightly modified relative to the example according to FIG. 2. A plan view of the example according to FIG. 3 would correspond to that according to FIG. 1 and is therefore not shown again. The example according to FIG. 3 largely corresponds to that shown in FIG. 2 so that in respect of common features it is referred to the above description. Identical details are provided with the same reference numbers as in FIGS. 1 and 2. The only difference of the example according to FIG. 3 is that the third rotational axis A3 crosses the second rotational axis A2 that extends parallel to the first rotational axis A1 at a distance. The distance in the present example corresponds to the axial offset V between the third axis A3 and the first axis A1, i.e. the first and the second Axes A1, A2 jointly form a plane that extends parallel to the third axis A3. In technical terms, this means that an axial offset is provided only in the hypoid set 17, 18, but not in the crown gear set 15, 16.

FIG. 4 shows a further example assembly which, again, is slightly modified relative to FIGS. 2 and 3 respectively. A plan view of the example according to FIG. 4 would correspond to that according to FIG. 1 and is therefore not shown again. The example according to FIG. 4 largely corresponds to that in FIGS. 2 and 3 respectively, so that in respect of common features reference is made to the above description, with identical details are provided with the same reference numbers as in FIGS. 1 to 3. The only difference of the example according to FIG. 4 is that the third rotational axis A3 intersects the first rotational axis A1 and the second rotational axis A2. This means that all three rotational axes A1, A2, A3 are arranged in the same plane. This also means that neither the hypoid set 17, 18 nor the crown gear set comprise an axial offset.

FIG. 5 shows an example driveline assembly 34 for a multi-axle driven motor vehicle. A first drive assembly 35 with an internal combustion engine 36 is provided, as well as an example electric drive 2 according to one of the embodiments according to FIGS. 1 to 4 as a second drive assembly. The driveline assembly 34 comprises a first driveline for driving a first driving axle 37 and a second driveline for driving a second driving axle 38. The internal combustion engine 36, via a multi-step transmission 39, drives a transfer case 40 via which torque is introduced into the first driveline and the second driveline respectively.

The first driveline 5 comprises a differential drive (not illustrated) via which an introduced torque is transmitted to the two sideshafts 41, 41' for driving the associated wheels 42, 42'. The sideshafts 41, 41' each comprise a constant velocity joint 43, 43', 44, 44' at the transmission end and at the wheel end respectively, which each permit a transmission of torque under angular movements.

The second driveline can be driven permanently (permanent four-wheel drive) or can be connected, as required, by a clutch arranged in the power path (on-demand drive). The second driveline comprises a propeller shaft 45 by which torque can be transmitted to the input part 21 of the second driveline assembly 2. The propeller shaft 45 is provided in the form of a multi-component shaft which comprises a first shaft portion with a first joint 46 at an end, a central joint 47, and a second shaft portion with a second joint 48 at an end.

The first driving axle 37 and the second driving axle 38 can be driven selectively via the first drive assembly 35 and/or the second drive assembly 2. When the vehicle is braked, the electric machine 3 of the second drive assembly can convert in a generator mode mechanical energy into electric energy. A special feature of the present driveline assembly 34 is that, because of the coaxial alignment of the electric machine 3 and the differential drive 6 and because of the transmission gearing 5 having the crown gear 16, the example drive assembly 2 has a particularly compact design and can therefore easily be integrated into the rear axle. In the present example, the first drive assembly 35 with internal combustion engine 36 being the primary driving source is associated to the front axle, whereas the second drive assembly 2 with electric motor 3 is associated to the rear axle. However, it is understood that depending on the type of vehicle, a reversed arrangement would also be possible, i.e. the electric drive 2 would be associated with the front axle and the primary drive 35 with the rear axle.

The invention claimed is:

1. An electric drive for driving a motor vehicle, comprising:
    an electric machine, a transmission gearing and a differential drive;
    wherein the electric machine comprises a motor shaft configured as a hollow shaft that is rotatingly driveable around a first rotational axis;
    wherein the transmission gearing comprises a drive gear connected to the motor shaft, at least one intermediate gear rotatingly drivable by the drive gear around a second rotational axis, a crown gear rotatingly drivable by the at least one intermediate gear around a third rotational axis, and a driven gear connected to the crown gear; and wherein the driven gear and the crown gear are arranged coaxially relative to each other and are connected to each other in a rotationally fixed way so that they rotate jointly around the third rotational axis, wherein the third rotational axis crosses the first rotational axis.

2. An electric drive according to claim 1, wherein the third rotational axis crosses at least one of the first rotational axis and of the second rotational axis at a distance.

3. An electric drive according to claim 1, wherein the third rotational axis intersects at least one of the first rotational axis and of the second rotational axis.

4. An electric drive according to claim 1, wherein the second rotational axis of the intermediate gear is arranged parallel to the first rotational axis.

5. An electric drive according to claim 1, wherein exactly one intermediate gear is provided that meshingly engages the drive gear driven by the electric machine as well as the crown gear.

6. An electric drive according to claim 1, wherein the crown gear comprises a greater diameter and a greater number of teeth then the drive gear, and a transmission ratio between the drive gear and the crown gear is between 3 and 4.

7. An electric drive according to claim 1, wherein the driven gear comprises a smaller diameter and a smaller number of teeth than the crown gear, and a transmission ratio between the crown gear and the driven gear is between 2 and 3.

8. An electric drive according to claim 1, wherein the driven gear and the crown gear of the transmission gearing are firmly connected to one another.

9. An electric drive according to claim 1, wherein the driven gear and the crown gear are firmly connected to a drive shaft.

10. An electric drive according to claim 1, wherein the differential drive comprises a differential carrier that is rotatingly drivable by the driven gear around the first rotational axis, a plurality of differential gears that rotate jointly with the differential carrier around the first rotational axis, and output gears that are drivingly connected to the differential gears.

11. An electric drive according to claim 1, wherein the differential drive comprises a ring gear that is arranged coaxially relative to the differential carrier and is firmly connected thereto, wherein the annular gear and the electric machine are arranged on different sides with respect to a central plane of the differential drive.

12. An electric drive according to claim 11, wherein one of the output gears of the differential drive is connected to an output shaft in a rotationally fixed way, wherein the output shaft extends through the hollow shaft of the electric machine.

13. An electric drive according to claim 1, wherein the electric machine, the transmission gearing and the differential drive comprise a common housing.

* * * * *